Nov. 17, 1964  A. B. RILEY  3,157,854
VEHICLE DECELERATION INDICATOR
Filed April 3, 1962

INVENTOR
ALFRED B. RILEY
BY
ATTORNEY

United States Patent Office 3,157,854
Patented Nov. 17, 1964

3,157,854
VEHICLE DECELERATION INDICATOR
Alfred B. Riley, 2 Hesketh St., Chevy Chase, Md.
Filed Apr. 3, 1962, Ser. No. 184,812
3 Claims. (Cl. 340—71)

This invention relates to deceleration indicators, and more particularly to a deceleration indicator for use with vehicles.

The indicator of the present invention comprises, essentially, an inertia actuated device carried by a vehicle, said device incorporating a plurality of electrical circuits and a source of current operatively connected to stop-light means mounted on the rear of a vehicle, said stop-light means comprising a band of light having a linear dimension which increases as the rate of stopping of the vehicle increases whereby, when the vehicle is suddenly stopped, each of the electrical circuits is successively closed by the inertia actuated device, depending upon the rate of stopping of the vehicle, to thereby illuminate the stop-light means.

Heretofore vehicle signaling devices have been employed to warn drivers of cars following the vehicle, so equipped, that said vehicle has stopped or is decelerating. Some of these signaling devices include stop-lights whose intensity of illumination increases when the vehicle is being braked. One of the disadvantages of signal devices of this type is that, although the driver of a car following the braked vehicle is aware that the vehicle is stopping, he does not know how fast the vehicle is being braked and as a result may collide with the rear of the braked vehicle. In this connection it is a matter of common knowledge that the accident rate due to rear-end collisions increases with night driving on turnpikes and other highways.

An object of the invention is to provide an improved decelerating indicator for vehicles, constructed and arranged whereby drivers of cars following a vehicle so equipped will be warned, not only that the vehicle is stopping, but also of the rate at which the vehicle is being braked.

Another object of the invention is to provide an improved decelerating indicator for vehicles, including stop-light means comprising a band of light, a linear dimension of which increases in response to the stopping rate of the vehicle, whereby the driver of a car following the vehicle so equipped will be warned of the rate at which the vehicle is being braked.

Yet another object of the invention is to provide improved vehicle stop-light means, including an inertia actuated device adapted to successively close a plurality of electrical circuits connected to a light band source, to thereby illuminate and increase a linear dimension of the light band in response to the rate of braking of the vehicle.

Still another object of the invention is to provide improved vehicle stop-light means, including a cylinder having a piston and piston rod slidably mounted therein, one end of said piston rod being adapted to successively close a plurality of electrical circuits connected to a light band source to thereby illuminate and increase a linear dimension of the light band in response to the braking rate of the vehicle.

A still further object of the invention is to provide improved vehicle stop-light means, including a column of conductive fluid, said column of conductive fluid being responsive to the inertia of the vehicle being braked to successively close a plurality of electrical circuits connected to a light band source to thereby illuminate and increase a linear dimension of the light band in response to the braking rate of the vehicle.

With these and other objects in view, which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful application to the particular constructions which, for the purpose of explanation, have been made the subject of illustration.

Figure 1:
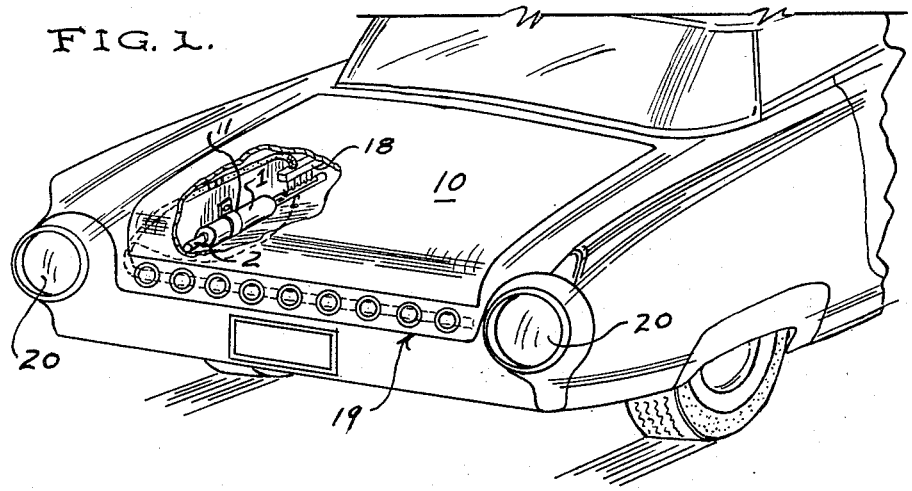
FIGURE 1 is a perspective view of the rear portion of a motor vehicle, showing one embodiment of the decelerating indicator of the present invention, mounted in operative position on the vehicle.
Figure 2:
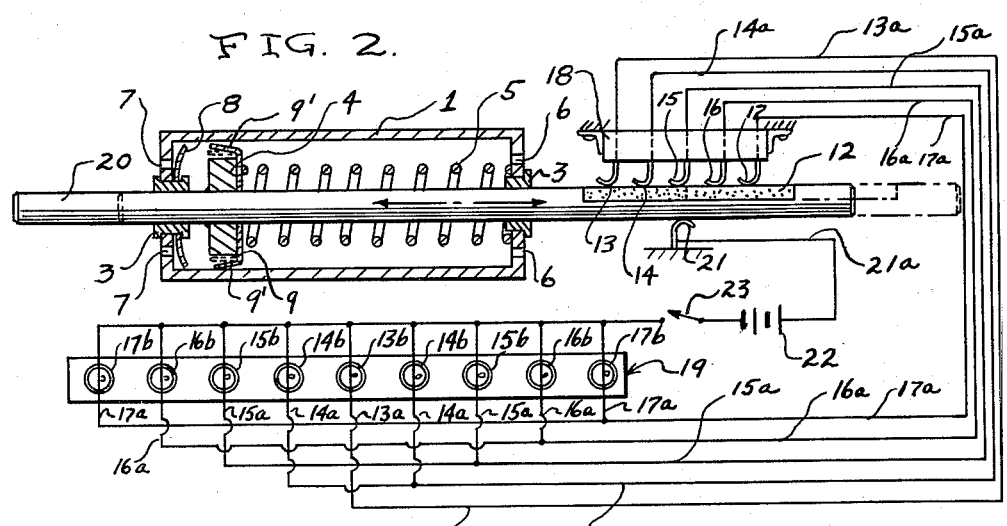
FIG. 2 is a schematic view showing the inertia actuated stop-light device and associated circuits of the decelerating indicator shown in FIG. 1.

Referring to the drawings and more particularly to FIGS. 1 and 2, one embodiment of the present invention comprises a cylinder 1, having a metallic rod 2 slidably mounted therein, said rod being supported on a suitable bearing 3 carried in each end of the cylinder. A piston 4 is rigidly secured to the rod, and a spring 5 is mounted between the piston and one end of the cylinder for biasing the rod and associated piston toward the opposite end of the cylinder. One end of the cylinder is provided with a plurality of ports 6 which maintain the interior of the cylinder open to the atmosphere, the opposite end of the cylinder being provided with a plurality of ports 7 and a flap valve 8 which opens said ports when the piston 4 moves in a direction to compress the spring 5, but closes the ports when the spring expands, moving the piston in the opposite direction. One face of the piston 4 is provided with a cup-shaped member 9 of felt or other suitable material, the periphery 9' of the cup-shaped member being adapted to flex inwardly when the piston is moved in a direction to compress the spring 5 and to flex outwardly against the inner surface of the cylinder 1 when the spring 5 expands to move the piston 4 in the opposite direction.

As will be seen in FIG. 1, the cylinder 1 and rod 2 may be mounted within the trunk portion of a vehicle 10 by means of a suitable clamp 11, in such manner that the cylinder and rod extend longitudinally of the trunk in a direction parallel to the longitudinal axis thereof. By means of this construction and arrangement, when the vehicle is suddenly braked the inertia of the piston 4 and its associated rod 2 will cause the rod to slide forward, to the right, as viewed in FIG. 2, thereby compressing spring 5; thereafter when the vehicle has come to a complete stop, the spring 5 will expand, thus moving the piston 4 and rod 2 rearwardly, to the left, as viewed in FIG. 2. This movement of the rod is dampened by virtue of the outward flexing of the peripheral portion 9' of the cup member 9 into engagement with the interior surface of the cylinder 1, and also by reason of closure of ports 7 by the flap valve 8. It will be noted that closure of ports 7 by the flap valve, and the flexing of the cup-shaped member 9 does not seal air within the cylinder, but restricts the flow of air out of the cylinder to thereby dampen the movement of the piston rod 2 and piston 4 during their return movement to the rear, i.e., to the left as viewed in FIG. 2, as the spring 5 expands.

One end of the rod 2 is provided with an insulated portion 12 adapted to be engaged by a plurality of contacts 13, 14, 15, 16 and 17, said contacts being carried by a suitable mounting block 18 secured to the vehicle as shown in FIG. 1. A plurality of lights, designated generally by the reference numeral 19, are mounted on the rear of the vehicle 10, (FIG. 1) in such a manner that they are aligned with the vehicle taillights 20. Contacts 13–17, inclusive, are connected by conductors 13a–17a, respectively, to suitable lights 13b–17b. To complete the deceleration indicator circuit, a contact 21 engages the rod 2, and through conductor 21a, the rod is connected to the vehicle battery 22, which is connected to the conductors 13a–17a, inclusive, through the conventional brake light switch 23.

In the operation of the deceleration indicator, assuming that the vehicle 10 is underway, the piston rod 2 and its associated piston 4 will be in a position shown in FIG. 2; that is, with spring 5 in an expanded position biasing the piston and piston rod to the left. If the vehicle brakes are applied at a relatively fast rate, the brake switch 23 closes, and the inertia of the piston and the rod causes the piston to slide forward (FIG. 1), i.e., to the right (FIG. 2), thereby compressing spring 5. As the rod slides forward, the insulated portion 12 thereof moves relative to the contacts 13, 14, 15, 16 and 17, as shown in dotted lines in FIG. 2. As the contacts successively engage the metallic portion of the rod 2, light 13b is first illuminated, then lights 14b, and so on. The number of lights illuminated will depend upon the extent of the forward movement of the rod 2, which, in turn, depends upon the braking rate of the vehicle. Thus, it will be seen that a band of light is produced, a linear dimension of which increases in response to the rate of stopping of the vehicle, whereby the driver of a following vehicle will be warned of the rate at which the preceding vehicle is being braked. After the vehicle 10 comes to a complete stop, the inertia of the piston rod 2 and piston 4 is overcome by the spring 5 which returns the piston and rod to their normal position, movement of the piston and rod being dampened, as explained hereinabove.

Figure 3:
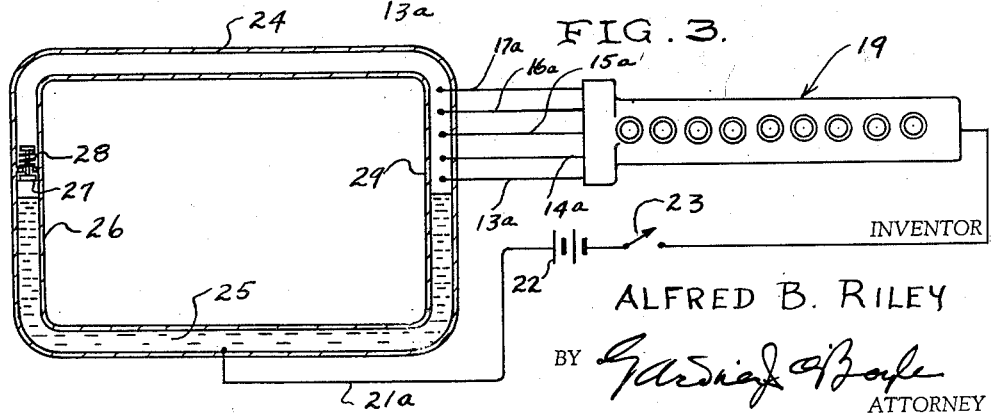
FIG. 3 is a schematic view showing another embodiment of the inertia actuated stop-light device and associated electrical circuits.

Another embodiment of the deceleration indicator is shown in FIG. 3, wherein an endless conduit 24 is provided with an electrical conductive fluid 25, such as mercury. One end 26 of the conduit is provided with a check valve 27 biased to open position by means of a spring 28, and the other end of the conduit accommodates the terminals of the conductors 13a, 14a, 15a, 16a and 17a. The remaining portion of the light circuit is the same as explained above in connection with the embodiment shown in FIG. 2. However, instead of the contact 21 engaging the rod, the terminal of conductor 21a extends through the conduit 24 and contacts the conductive fluid 25.

When the deceleration indicator is mounted on a vehicle, the conduit 24 will be secured to the vehicle in such a manner that its end portions 26 and 29 will extend in a longitudinal direction with respect to the longitudinal axis of the vehicle; that is, end 26 will extend toward the rear of the vehicle and the opposite end 29 will extend toward the front of the vehicle. Thus, when the vehicle is braked, the column of conductive fluid 25 within the conduit end portion 29 will rise to successively engage each of the contacts 13a, 14a, 15a, 16a, 17a depending upon the rate of braking of the vehicle, to thereby successively illuminate the lights 19, as explained above with respect to the embodiment shown in FIG. 2. While the column of fluid 25 is rising within the conduit end portion 29, the level of the column of fluid within the conduit end portion 26 is falling, so that, after the vehicle has come to a complete stop, the conductive fluid will seek its normal levels within the conduit end portions 26 and 29, and in so doing, the column of fluid within the conduit end portion 26 rises, thus trapping air between the fluid level and the check valve 27, and thereby closing the check valve to dampen the return movement of the conductive fluid 25 to its normal position. The valve 27, while in a closed position, does not trap air within the conduit end portion 26, but rather restricts the flow of air from one side of the valve to the other. Once the levels of the conductive fluid reach their normal positions, the spring 28 biases the valve 27 to open position.

Although the described deceleration indicator employs nine lamps, it will be appreciated that any number of lamps may be used, and in lieu of using individual lamps, a different source of light may be employed as long as it is of the type which produces a light band, a linear dimension of which increases, depending upon the rate of braking of the vehicle. With reference to the increase in a linear dimension of the light band, it will be appreciated that the light circuits can be arranged so that the band becomes wider, or longer as desired.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A vehicle deceleration indicator of the character described comprising, vehicle stop-light means, said stop-light means including a light band having a variable linear dimension, inertia actuated switch means adapted for mounting on a vehicle, a plurality of electrical circuits, including a source of current severally connected to the inertia actuated switch means and to the vehicle stop-light means, whereby upon braking of the vehicle, the inertia actuated switch means moves in a direction to sequentially energize the electrical circuits, to thereby illuminate the stop-light means while simultaneously increasing the linear dimension of the light band in response to the braking rate of the vehicle, whereby the driver of a vehicle following the first-mentioned vehicle will be warned of the rate at which the first-mentioned vehicle is being braked, said inertia actuated switch means moving in the opposite direction to sequentially de-energize said electrical circuits when the first-mentioned vehicle comes to rest to thereby decrease the linear dimension of the light band, and dampening means operatively connected to said inertia actuated switch means to retard said opposite movement of the inertia actuated switch means, said dampening means being constructed and arranged with respect to the inertia actuated switch means, whereby to permit free movement of the switch means in a direction to sequentially energize the electrical circuits, and to retard movement of said switch means in an opposite direction to sequentially de-energize said electrical circuits.

2. A vehicle deceleration indicator according to claim 1, wherein the inertia actuated switch means includes a cylinder, a rod slidably mounted within the cylinder, a piston carried by the rod, said rod having an end portion extending outwardly through one end of the cylinder, the end portion of the rod being progressively, operatively connected to the electrical circuits, whereby upon braking of the vehicle, the inertia of the rod and the piston causes the rod to move relative to the cylinder and sequentially close the electrical circuits, a spring mounted between the piston and one end of the cylinder for biasing the piston and rod toward the opposite end of the cylinder, whereby the spring is compresesd between the piston and one end of the cylinder during braking of the vehicle, and when the spring overcomes the inertia of the piston and rod the spring expands, thereby returning the piston and rod toward the opposite end of the cylinder; and wherein the dampening means is operatively associated with the cylinder and piston of the inertia actuated switch means.

3. A vehicle deceleration indicator according to claim 1, wherein the inertia actuated means includes, an endless conduit, said conduit being partially filled with an electrical conductive fluid to thereby form a fluid column in each end portion of the conduit, the endless conduit being operatively connected to the electrical circuits, whereby upon braking of the vehicle, the inertia of the conductive fluid causes the level of the fluid column to rise in one end portion of the conduit and sequentially close the electrical circuits, said electrical conductive fluid column returning to its original level when the vehicle comes to rest; and wherein the dampening means is constructed and arranged with respect to the endless conduit, whereby to permit free, unobstructed movement of the electrical conductive fluid in a direction to sequentially close the electrical circuits and to retard movement of the electrical conductive fluid in the opposite direction to sequentially open said electrical circuits.

References Cited by the Examiner

UNITED STATES PATENTS

| | | | |
|---|---|---|---|
| 1,970,483 | 8/34 | Alden | 340—262 |
| 1,983,830 | 12/34 | Alden | 340—262 |
| 3,022,393 | 2/62 | Weaver | 200—61.45 |
| 3,057,976 | 10/62 | Weaver | 200—61.45 |

FOREIGN PATENTS 1,100,013   9/55   France.

NEIL C. READ, *Primary Examiner.*